(12) United States Patent
Overall et al.

(10) Patent No.: US 10,836,508 B2
(45) Date of Patent: Nov. 17, 2020

(54) CAMERA DRONE

(71) Applicants: Jeffrey Paul Overall, Fountain Valley, CA (US); Jeffrey Steven Spirk, Fountain Valley, CA (US)

(72) Inventors: Jeffrey Paul Overall, Fountain Valley, CA (US); Jeffrey Steven Spirk, Fountain Valley, CA (US)

(*) Notice: Subject to any disclaimer, the term of this patent is extended or adjusted under 35 U.S.C. 154(b) by 336 days.

(21) Appl. No.: 15/898,356

(22) Filed: Feb. 16, 2018

(65) Prior Publication Data

US 2019/0258139 A1 Aug. 22, 2019

(51) Int. Cl.
| | |
|---|---|
| B64D 47/08 | (2006.01) |
| G03B 15/00 | (2006.01) |
| B64C 39/02 | (2006.01) |
| B64C 27/08 | (2006.01) |
| H04N 5/232 | (2006.01) |
| H04N 5/225 | (2006.01) |

(52) U.S. Cl.
CPC ............. B64D 47/08 (2013.01); B64C 27/08 (2013.01); B64C 39/024 (2013.01); G03B 15/006 (2013.01); H04N 5/2253 (2013.01); H04N 5/23203 (2013.01); H04N 5/23293 (2013.01); B64C 2201/027 (2013.01); B64C 2201/108 (2013.01); B64C 2201/127 (2013.01)

(58) Field of Classification Search
CPC .. B64C 2201/127; B64D 47/08; G03B 15/006
See application file for complete search history.

(56) References Cited

U.S. PATENT DOCUMENTS

| | | | |
|---|---|---|---|
| 4,114,995 | A | 9/1978 | Stieringer |
| 5,191,373 | A | 3/1993 | Nakano |
| 5,548,334 | A | 8/1996 | Ichiyoshi |
| 5,633,660 | A | 5/1997 | Hansen |
| 5,742,341 | A | 4/1998 | Ohishi |
| 6,445,417 | B1 | 9/2002 | Yoshida |
| 6,670,950 | B1 | 12/2003 | Chin |
| 7,580,627 | B2 | 8/2009 | Kamei |
| 8,395,669 | B2 | 3/2013 | Uchida |
| 8,908,573 | B1 | 12/2014 | Wang |
| 9,051,050 | B2 | 6/2015 | Achtelik |
| 2012/0083945 | A1* | 4/2012 | Oakley .................. B64C 27/08 701/2 |
| 2017/0043870 | A1 | 2/2017 | Wu |
| 2017/0070125 | A1 | 3/2017 | Bei |
| 2019/0291864 | A1* | 9/2019 | Liu ......................... B64C 37/00 |
| 2020/0140085 | A1* | 5/2020 | Deng ..................... B64C 39/024 |

* cited by examiner

Primary Examiner — Nicholas McFall

(57) ABSTRACT

Devices and methods improving the ability to capture images remotely and manually with a camera integrated with or attached to a drone. A display screen on the drone body allows viewing of captured image data. Booms are configured to both support the flight components of the drone and allow manipulation. Boom handles allow a user to hold and manually aim the camera.

2 Claims, 7 Drawing Sheets

CAMERA DRONE

FIELD OF INVENTION

The present invention relates to image capture and unmanned vehicles. Specifically, it relates to a drone configured for both remote aerial and manual filming.

BACKGROUND/PRIOR ART

Drones and other unmanned vehicles are now widely used in cinematography and photography. Drones have replaced manned vehicles, cranes, jibs and cables as a cheap and superior alternative to aerial, in-motion, and perspective image capture. Advanced camera and gimbal technologies are now integrated with drones, allowing elite photographic and video recording. Drone use on film sets and photo shoots enables a greater variety of shots, and image capture in more confined spaces and reduced time.

Remote-controlled drone filming is preferable to manual filming for a number of reasons. Advanced camera technology permits capture of high quality image content. Gimbal systems allow stability and control needed for smooth tracking, arc, pans, tilts or other motion filming techniques. Both aerial and manual filming can be accomplished with the same device, reducing the amount of equipment necessary and the price of filming. Using one device can also decrease the time and steps needed to transition between aerial and handheld image capture.

However, obstacles to manual filming with drones exist. Drones are often difficult to grip and manipulate because they are not configured for such use. Viewing captured footage is also difficult. While traditional cameras and camcorders have display screens presenting the captured image data, drones do not. These deficiencies cause users to either capture images blind or attach cumbersome display devices.

The present invention enhances the ability to manually photograph and record video footage with a flight capable drone. A display interface provides a real-time view of the captured image data. Boom handles allow ergonomically sound gripping and control of the drone. Command inputs allow a user to manually control the camera and gimbal system. Adjustable boom and propeller configurations permit quick transition between aerial and manual filming.

SUMMARY

An exemplary embodiment is a multi-rotor quadcopter drone. "Flight components" is used herein to denote the flight enabling external components of the drone. Flight components may include rotors and propellers. "Drone body" is herein used to denote the central component used to house or support the battery, main boards, processors, cameras, gimbals, sensors, GPS module, flight controller, and other components. The booms, wings, and other flight components may extend from the drone body. The term "boom" is used to denote the strut-like component or components used to connect the drone body with the rotors or other flight components. "Gimbal system" is herein used to denote any mechanism used to suspend, stabilize, rotate, control, suspend or otherwise interact with a camera.

The exemplary drone body is cuboid shaped and contains a planar top surface. A display interface is integrated into the top surface of the drone. The display interface may serve the dual functions of viewfinder and control interface for the camera, gimbal and other drone components. The exemplary viewfinder is an LCD screen with touchscreen capability. The display interface permits real-time viewing of image content captured by an integrated drone camera when filming manually. The display interface viewfinder may contain control icons functioning as command inputs, allowing control of camera and drone function commands and adjustment of settings. The display interface may lay flush with the body for optimal flight aerodynamics.

Two boom handles extend laterally from the drone body. A boom pivot at the distal end of each boom handle couples the boom wings. A rotor is located at the distal end of each boom wing. A power button may be located on the surface of the drone. The power button can activate both the drone's flight components (rotors, landing legs, etc.), and camera and gimbal system. The power system may allow separate activation of the flight components and camera and gimbal system, or any other combination of components, to facilitate power conservation. Power may be activated by a detached device, such as a remote controller.

Boom handles are configured to function as both supports for the flight components of the drone and as handles capable of being handheld and hand manipulated. The boom handles may contain control panels. The control panels may contain manual filming command inputs. The command inputs allow quick manipulation using the thumbs or fingers. Commands for camera and gimbal function and setting may include focus, zoom, aperture, shutter speed, playback controls. The control panel may contain a separate power actuator for the camera and gimbal system. This may enable energy preservation while filming manually.

Boom wings may be attached to the distal end of the boom handles, relative to the drone body. In the exemplary embodiment two boom wings extend perpendicularly from each boom handle. A rotor and propeller are positioned at the distal end of each boom wing.

A control device is capable of communicatively coupling with the drone and transmitting control commands remotely, in a known manner.

The display interface and command inputs are communicatively coupled with the camera and gimbal system. Commands may be transmitted from the command inputs and command icons, serving as control inputs, on the interface to the camera and gimbal system. Image, sensor and other data received by the camera may be transmitted to the display interface or control inputs to facilitate operation.

The display, gimbal, camera, transmission components, and other components may generate substantial heat when actuated. The drone body may contain heat sinks and other heat dissipation means to counter issues presented by possible heat caused by components and the resultant conductivity.

The display screen may utilize LCD, LED, OLED, or any other electronic display technology. Touchscreen technology may be utilized to allow input of control commands and direct manipulation of the display interface. Command inputs on the boom handles may be communicatively coupled with the display interface and function as means of controlling and manipulating the display interface.

Boom handles may be adjustable or operatively coupled with the drone body to allow alternative or greater range of motion when manually filming. A ball joint or other bearing mechanism may be used to allow adjustment of the boom handles.

The boom wings may be removable or adjustable to permit increased user range of motion and increased free field of vision. The boom wings may also be pivoted relative to the boom handles to allow alternative grip configurations.

Adhesive, rubber, synthetic, or other material may be applied to the boom handles to augment grip and control ability.

The drone camera may utilize an alternative number of booms and flight components. The exemplary embodiment discussed herein uses four rotors and four horizontally oriented propellers, commonly known as a quadcopter configuration. Alternative embodiments may feature an alternative number of rotors and propellers as a means of propulsion.

A plurality of displays may be situated on the drone body. Displays on the back surface, facing the user's torso, may be used to allow viewing of captured image data when the drone camera is positioned higher up the user's torso, or in front of the user's face.

The display or displays may be able to rotate, hinge, or otherwise move relative to the drone body. Adjustment of screen may allow the most beneficial orientation based on the viewpoint of the user and optical axis of the camera.

Alternative embodiments may have retractable booms and flight components. In such embodiments the user may grip the drone body directly. This arrangement may allow for control of the camera and simultaneous viewing of the display interface.

DRAWING NUMERALS

Figure 1:
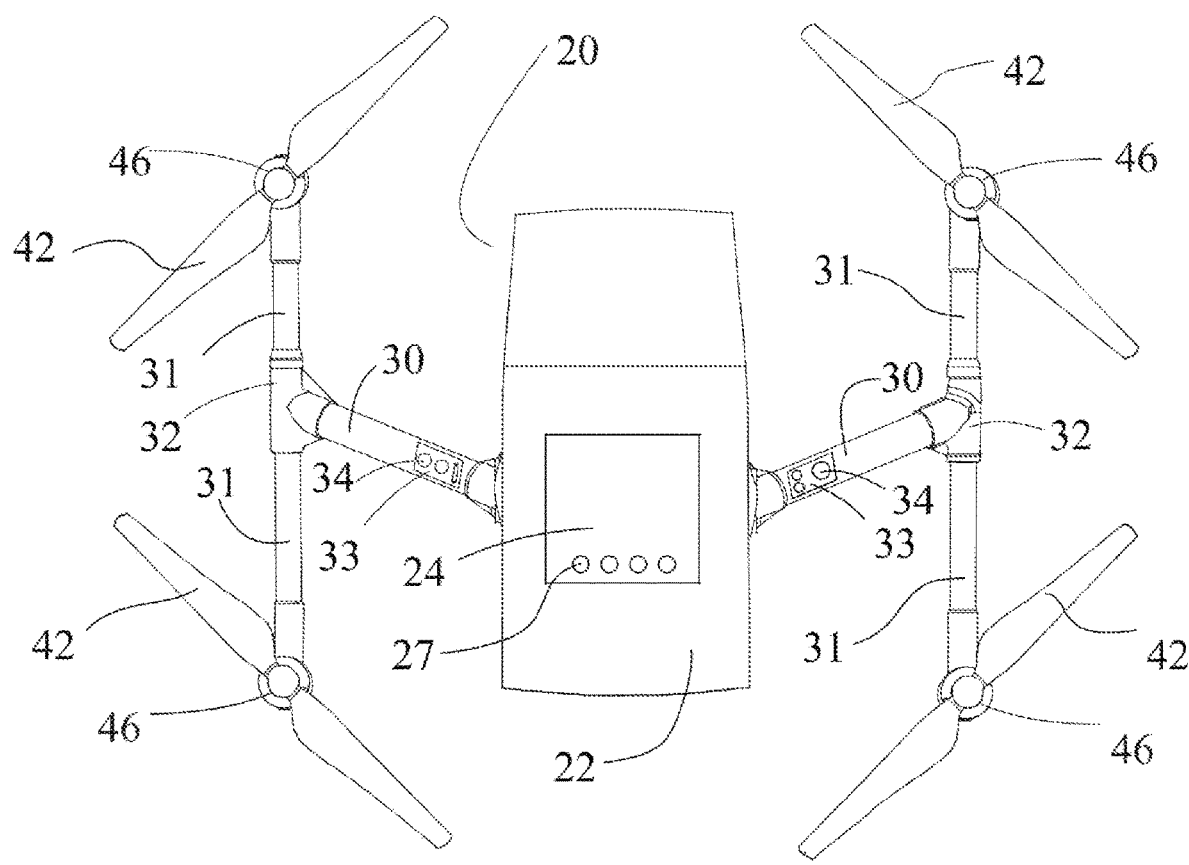
FIG. 1 is a top view of a Camera Drone in flying mode.

20 Camera Drone
22 Drone body
24 Display interface
25 Auxiliary Display interface
26 Camera
27 Control Icons
28 Gimbal system
30 Boom Handles
31 Boom Wings
32 Boom Pivot
33 Control panel
34 Command inputs
42 Propellers
44 Landing Legs
46 Rotor

DETAILED DESCRIPTION OF THE DRAWINGS

FIG. 1 shows the camera drone 20 viewed from the top. A display interface 24 is positioned on the top of a drone body 22. Two boom handles 30 extend from the drone body 22.

The display interface 24 is communicatively linked with a drone camera 26 and gimbal system 28 (not shown). Image data can be transmitted from the camera, processed and displayed on the display interface 24 in real-time. Control commands may be input on the display interface 24 and transmitted to the camera 26 and gimbal system 28. Control panels 33 are positioned on both boom handles 30. The control panels 33 contain command inputs 34. Command inputs 34 are positioned to allow a user to manipulate them by thumb or finger while holding the boom handle 30. The command inputs 34 in the exemplary embodiment are for time-sensitive camera and gimbal functions. Shutter function, zoom, aperture size and other frequently used functions or commonly changed settings may be controlled using the control panel 33 command inputs 34.

The exemplary camera drone 20 utilizes a quadcopter configuration for propulsion. Boom pivots 32 connect the boom handles 30 and boom wings 31. A rotor 46 and propeller 42 are positioned at the end of each boom wing 31.

Figure 2A:
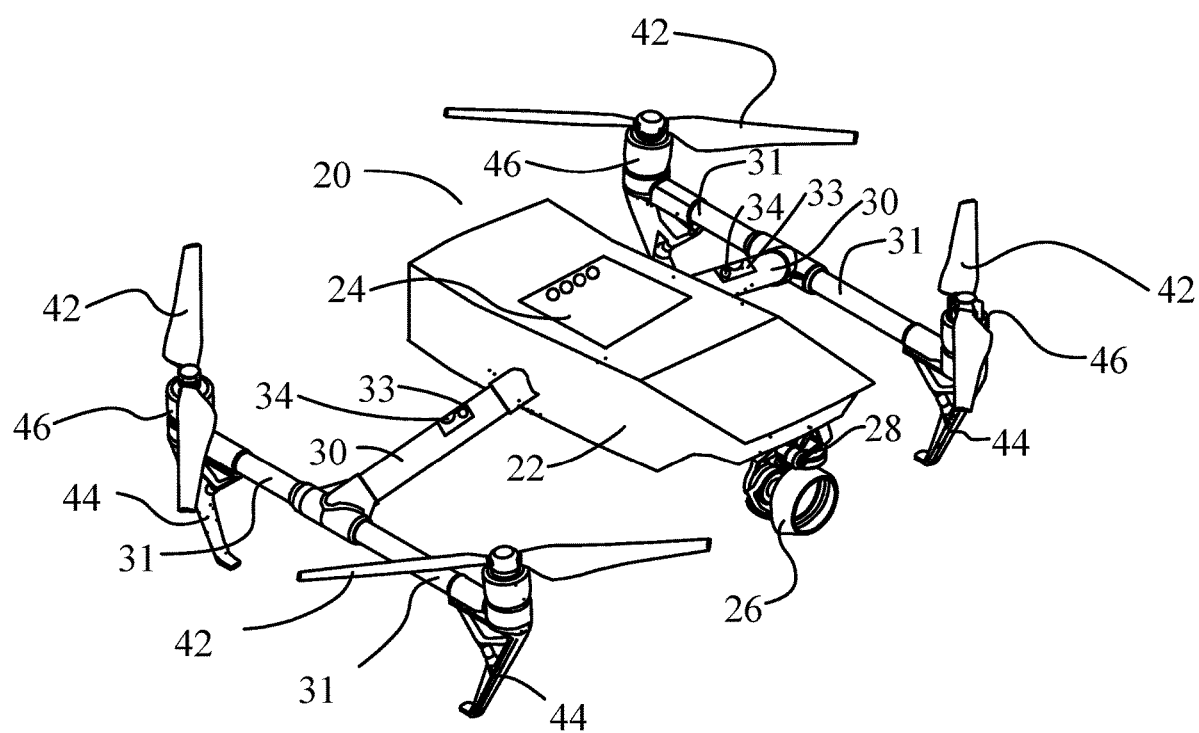
FIG. 2A is a front and top perspective view of a Camera Drone in flying mode.
Figure 2B:
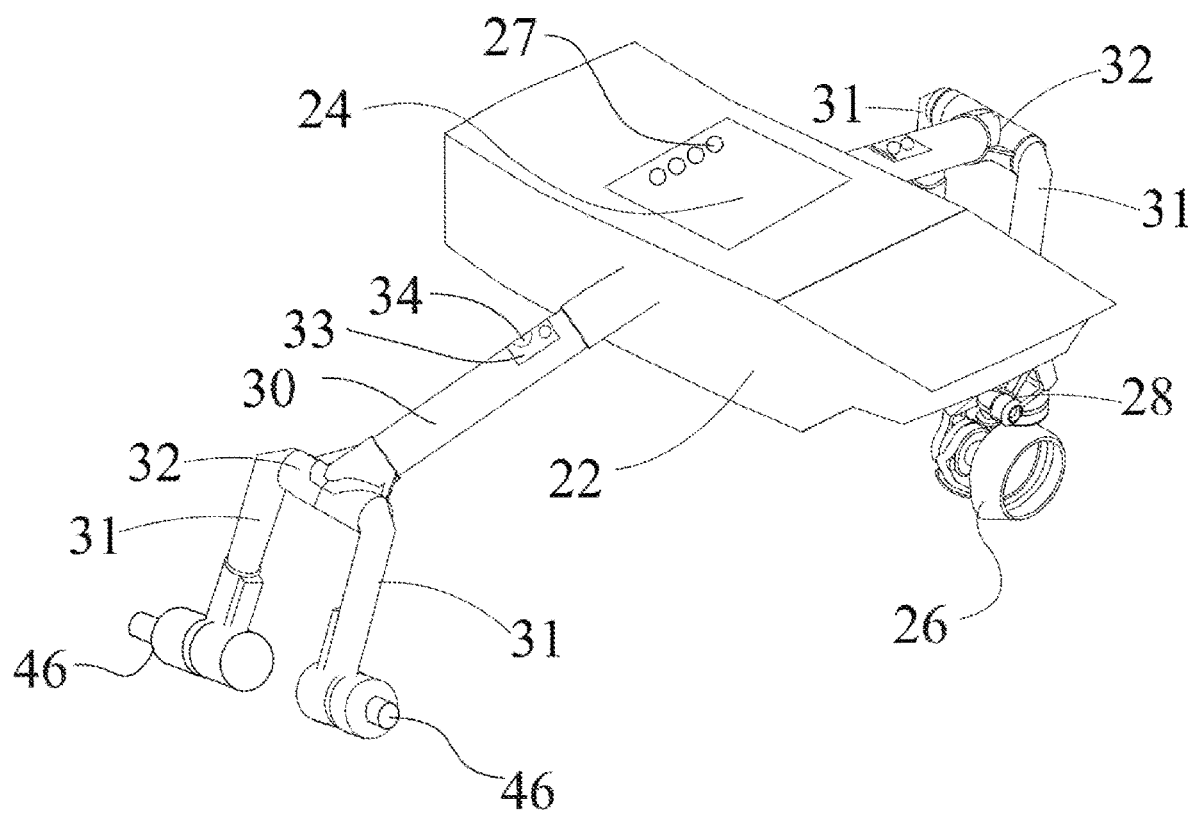
FIG. 2B is a front and top perspective view of a Camera Drone in camcorder mode.

FIG. 2A-2B show a perspective view of the camera drone 20. 2A depicts the exemplary camera drone 20 in flying mode. Propellers 42 and landing legs 44 remain installed. The boom wings 31 remain in the outright position required for flying as a quadcopter.

The drone has been switched to camcorder mode in FIG. 2B. The propellers 42 and landing legs 44 are removed. The boom wings 31 are folded down using the boom pivots 32. The boom pivots 32 utilize a hinging mechanism to allow adjustment and locking of the boom wings 31. The folded boom wings 31 extend down and away from the boom handles 30 and control panels 33, creating temporary vertical handles. The rotors 46 remain attached. Electrical wiring and other connection to the rotors 46 or other components remain intact while the boom wings 31 are folded.

Manual filming is possible from both flight and camcorder mode. Manual filming while in flying mode may be beneficial when the rapid change from manual to remote aerial filming is necessary. Camcorder mode may provide additional range of motion by removing the boom wings 31 and rotor 46 from the path of the user's wrists. Removal also eliminates the possibility of damage to the propellers 42 and landing legs 44.

A gimbal system 28 and camera 26 are positioned at the front, opposite the user, of the drone body 22.

Figure 3A:
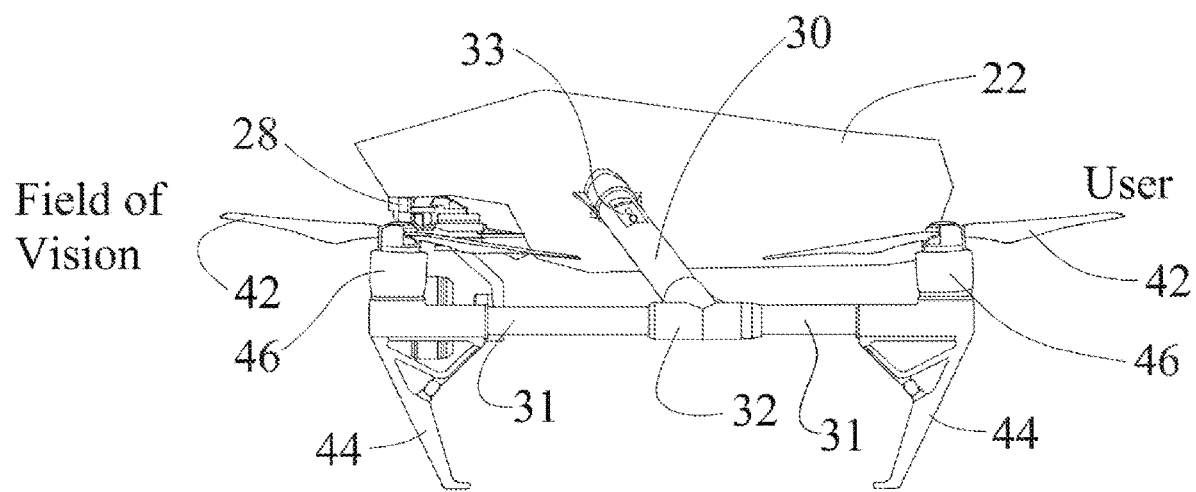
FIG. 3A is a right side view of a Camera Drone in flying mode.
Figure 3B:
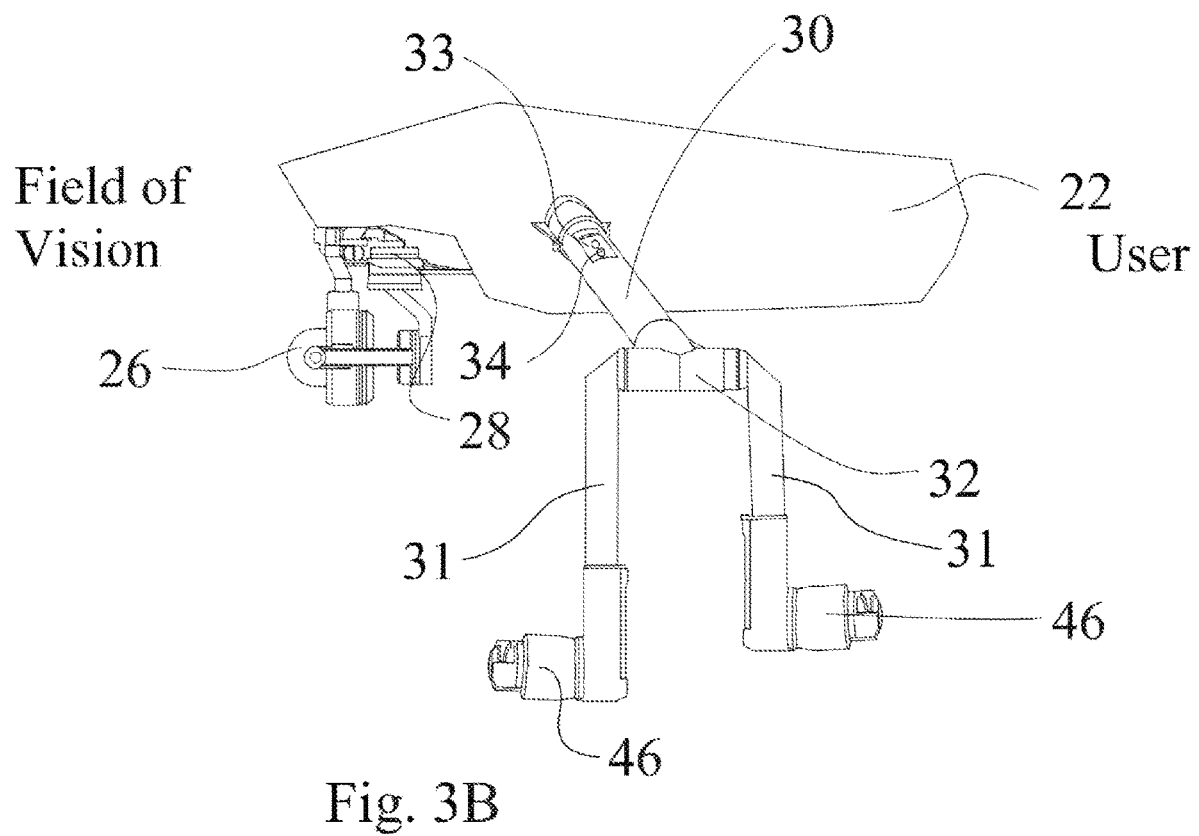
FIG. 3B is a right side view of a Camera Drone in camcorder mode.

FIG. 3A-3B show a side view of the camera drone. The text indicates the relative position of the user and the field of view from which image data may be captured. FIG. 3A shows the camera drone in flying mode. The gimbal system 28 and camera 26 are covered by the boom wing 31, rotor 46, and propeller 42. The camera 26 and gimbal system 28 can be seen in FIG. 3B, with the boom wings 31 folded. The gimbal system 28 aids in stabilization of the camera 26 when moved around the roll, yaw, and pitch axes, or any combination thereof. The movement of the gimbal system 28 may be controlled by the control inputs 34 or control icons 27 on the display interface 24 (not shown). The boom handles 30 can also be used to manually aim the camera 26. The gimbal system 28 still provides camera stabilization when not used to actively manipulate the camera 26. The exemplary boom handles 30 extend downward away from the user and backwards towards the user. This configuration may enhance ergonomics. The top surface of the drone body 22 is slightly slanted, but maintains a predominantly planar configuration to allow easy viewing of the display interface 24. The back portion of the top of the body slopes gradually upward towards the center of the drone body 22. This places the display interface 24 at an angle allowing easier viewing when operated by the viewer and may reduce glare from overhead light sources. The top surface apexes above (relative to the user) the display interface 24. To preserve aerodynamics, the top surface gradually slopes towards the front of the drone body from the apex.

Camcorder mode may allow a user better control when orienting the drone camera 20 higher up the torso or in front of the face. The field of vision is also increased by folding of the front rotors 46 and boom wings 31 away from the camera. The vertical handles 36 allow the user to hold the drone with a neutral grip. This positioning may allow better, more ergonomically correct control when the user holds the camera higher up her body (i.e. chest or head area).

Figure 4:
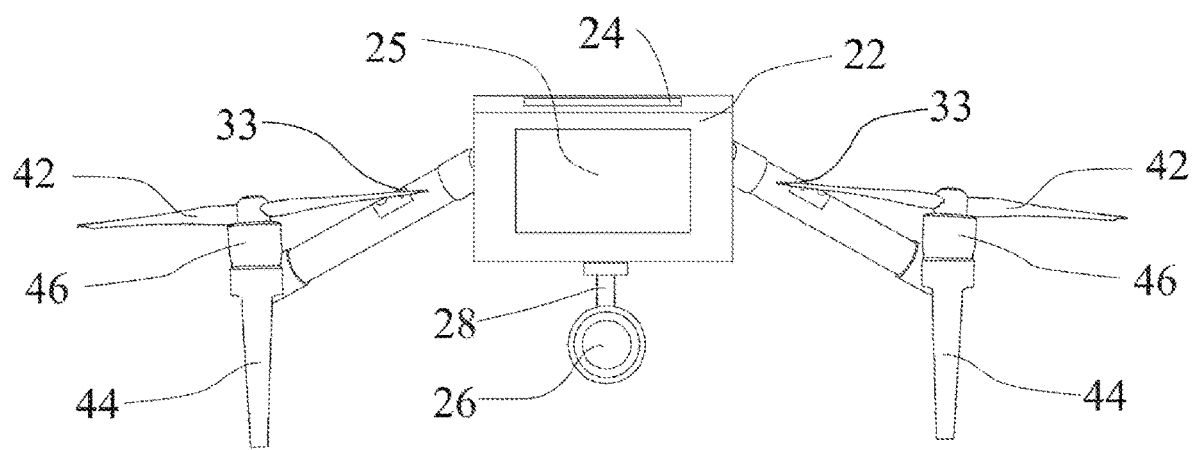
FIG. 4 is a front view of a Camera Drone in flying mode.

FIG. 4 shows an alternative embodiment with an auxiliary display interface 25 on the back surface of the drone body 22. The auxiliary display interface 25 may serve as the lone display or function in tandem with a display interface 24 positioned on top of the drone body 22. The auxiliary display 25 allows easier viewing when the drone camera 26 is held further up the user's torso or in front of the face.

Figure 5:
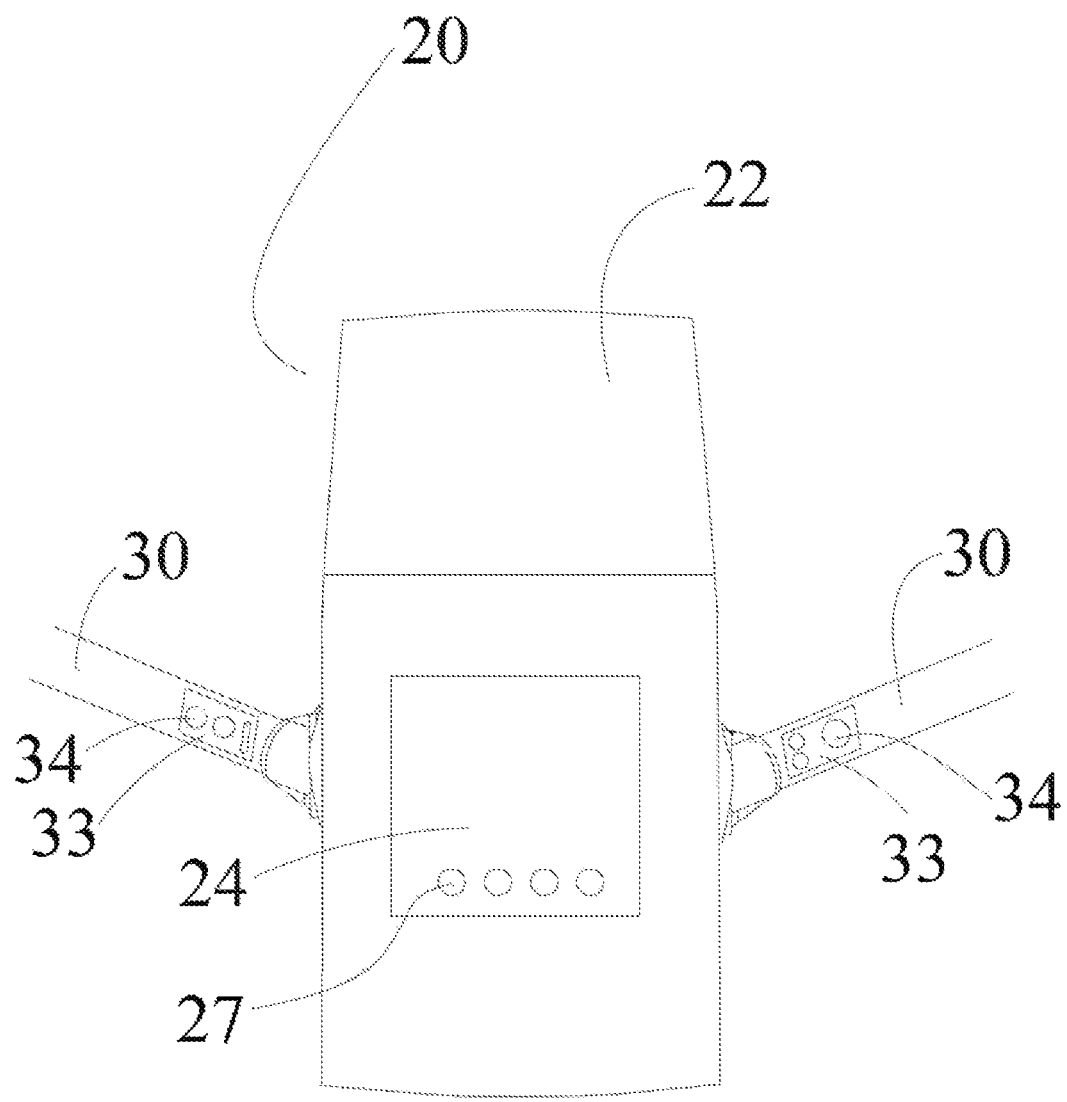
FIG. 5 is a top view of a drone body and boom handle aspects of a Camera Drone.

FIG. 5 shows a magnified view of the display interface 24 and control panels 33. In the exemplary embodiment the camera function control inputs 34 are located on the right control panel 33. Camera function controls may include shutter command, zooming, ISO setting, aperture or other time sensitive image capture functions or settings. The left control panel 33 may include control inputs for additional camera controls or controls for the gimbal system 28.

The foregoing disclosure is intended to be illustrative and not limiting the scope of the invention. Merely exemplary embodiments and methods related to the invention are discussed and described. As will be understood by those familiar to the art, the disclosed subject matter may be embodied in other forms or methods without departing from the essence of the invention, which is set forth in the claims.

We claim:

1. A drone, comprising:
   a. a camera coupled with a drone body,
   b. at least one display interface situated on the surface of the drone body,
   c. two boom handles extending from the drone body,
   d. at least one command input on at least one of said boom handles,
   e. said command input being communicatively coupled with said camera and said display interface,
   f. wherein said command input is a means of controlling the camera.

2. A drone, comprising:
   a. a drone body,
   b. a camera integrally connected with the drone body,
   c. at least one display interface situated on the drone body, said display interface being communicatively coupled with said camera,
   d. a command input communicatively coupled with said camera,
   e. wherein said command input is a means of controlling the camera,
   f. further comprising at least one boom handle as means of manually controlling said drone body,
   g. the at least one boom handle comprising the command input.

* * * * *